United States Patent
Azher et al.

(10) Patent No.: US 12,140,468 B2
(45) Date of Patent: Nov. 12, 2024

(54) METHOD FOR DOSING A TARGET COMPONENT

(71) Applicant: Hüttlin GmbH, Schopfheim (DE)

(72) Inventors: Syed Muhammad Mushahid Azher, Weil am Rhein (DE); Christian Gebauer, Kandern (DE); Christian Karl Paasche, Bad Säckingen (DE); Marc Michaelis, Lörrach (DE); Isabelle Hemming, Schopfheim (DE)

(73) Assignee: Hüttlin GmbH, Schopfheim (DE)

( * ) Notice: Subject to any disclaimer, the term of this patent is extended or adjusted under 35 U.S.C. 154(b) by 425 days.

(21) Appl. No.: 17/613,235

(22) PCT Filed: Sep. 9, 2020

(86) PCT No.: PCT/EP2020/075135
§ 371 (c)(1),
(2) Date: Nov. 22, 2021

(87) PCT Pub. No.: WO2021/052824
PCT Pub. Date: Mar. 25, 2021

(65) Prior Publication Data
US 2022/0214207 A1 Jul. 7, 2022

(30) Foreign Application Priority Data
Sep. 17, 2019 (DE) ............. 10 2019 214 156.0

(51) Int. Cl.
*G01G 13/24* (2006.01)
*B01F 33/84* (2022.01)
*B01F 35/88* (2022.01)

(52) U.S. Cl.
CPC .......... *G01G 13/241* (2013.01); *B01F 33/84* (2022.01); *B01F 35/881* (2022.01)

(58) Field of Classification Search
CPC ............................ G01G 13/241; B01F 35/881
See application file for complete search history.

(56) References Cited

U.S. PATENT DOCUMENTS

| 3,835,873 A * | 9/1974 | Wildpaner ........... G05D 11/133 106/746 |
| 2009/0199186 A1 | 8/2009 | Rosskopf |

(Continued)

FOREIGN PATENT DOCUMENTS

| CN | 1275065 A | 11/2000 |
| CN | 1423744 A | 6/2003 |

(Continued)

OTHER PUBLICATIONS

Translation of International Search Report for Application No. PCT/EP2020/075135 dated Nov. 19, 2020 (2 pages).

(Continued)

*Primary Examiner* — Natalie Huls
(74) *Attorney, Agent, or Firm* — Michael Best & Friedrich LLP

(57) ABSTRACT

The invention relates to a method for dosing a target component (20), wherein a dosing system (10) doses the target component (20) to a target value (Z20), which corresponds to a desired nominal value (S20*soll*), wherein an additional dosing system (12) doses at least one additional component (21, 22, 23) to be follow-on dosed, to a target value (Z21) of the component (21, 22, 23) to be follow-on dosed which is lower than a desired nominal value (S21*soll*) of the component (21, 22, 23) to be follow-on dosed, wherein an actual value (G20*ist*) of the target component (20) and at least one actual value (G21*ist*) of the component (21, 22, 23) to be follow-on dosed are then determined, a content (A) of the target component (20) then being calculated according to the actual value (G20*ist*) of the target component (20) and/or the actual value (G21*ist*) of the (Continued)

component (21, 22, 23) to be follow-on dosed and the content (A) being compared to a limit value (T) or tolerance band (T), at least the component (21, 22, 23) to be follow-on dosed being additionally dosed in the event of the limit value (T) or tolerance band (T) being exceeded.

15 Claims, 2 Drawing Sheets

(56) References Cited

U.S. PATENT DOCUMENTS

| | | | |
|---|---|---|---|
| 2015/0183537 A1 | 7/2015 | Canestri et al. | |
| 2019/0185187 A1 | 6/2019 | Gandhi et al. | |

FOREIGN PATENT DOCUMENTS

| | | | | |
|---|---|---|---|---|
| CN | 1684756 | A | 10/2005 | |
| CN | 1782679 | A | 6/2006 | |
| CN | 101848753 | A | 9/2010 | |
| CN | 103085171 | A | 5/2013 | |
| CN | 103335702 | A | 10/2013 | |
| CN | 104865830 | A | 8/2015 | |
| CN | 105264345 | A | 1/2016 | |
| CN | 106017636 | A | 10/2016 | |
| CN | 107478314 | A | 12/2017 | |
| CN | 107998923 | A | 5/2018 | |
| CN | 108534879 | A | 9/2018 | |
| CN | 108955846 | A | 12/2018 | |
| CN | 208606878 | U | 3/2019 | |
| DE | 19512416 | A1 | 11/1995 | |
| DE | 19939042 | A1 | 3/2001 | |
| DE | 102006054604 | A1 | 5/2008 | |
| JP | 2001124619 | A | 5/2001 | |
| JP | 2001139149 | A | 5/2001 | |
| JP | 2003028702 | A | 1/2003 | |
| RU | 2291131 | C1 * | 1/2007 | ............. C04B 28/18 |
| RU | 2621176 | C1 * | 5/2017 | |
| WO | WO-0042390 | A2 * | 7/2000 | ........... G01G 13/024 |
| WO | 2007084060 | A1 | 7/2007 | |

OTHER PUBLICATIONS

International Preliminary Report on Patentability for Application No. PCT/EP2020/075135 dated Mar. 31, 2022 (8 pages).

Tian Jin, "The Simulation Research on Adjustability of Cement Raw Mix Proportioning Project to Primary Material", China Building Material Academy, dated Apr. 2004 (104 pages including English Abstract on p. 4).

China Patent Office Action for Application No. 202080029179.7 dated Feb. 26, 2024 (14 pages including English translation).

* cited by examiner

METHOD FOR DOSING A TARGET COMPONENT

BACKGROUND

The present invention concerns a method for dosing a target component.

DE 102006054604 A1 discloses a packing machine for packing fine-grained product in packages, comprising a product feed unit, a dosing device, a receiving vessel and scales.

SUMMARY

A control device is provided which is connected to the scales and the dosing device in order to regulate the dosed quantity depending on the weight determined by the scales. It is an object of the present invention to further improve the accuracy, in particular when dosing a plurality of components.

In comparison, the method according to the invention for dosing a target component has the advantage that a more precise dosing of a component in a mixture can be performed automatically. In particular, over-dosing of an individual component in a mixture can be prevented. In the production of mixtures, quite often the individual components are weighed and indeed lie within the given tolerances, but do not correspond to the respective nominal weight. The method according to the invention can prevent a resulting ratio of components from deviating from the nominal value. Thus in many cases, the resulting total mass is not as important as the ratio of the individual components to one another, so that according to the invention, a correction is made in favor of a precise ratio. There is no need to reject a component already weighed, since all components are adapted in relation to the component to be precisely dosed. In particular with poorly flowing components which must be dosed precisely (for example, medicinal agents), use can be made of the fact that the components for after-dosing (auxiliary substances) usually offer a greater degree of freedom with respect to flowability or dosing accuracy. According to the invention, this is achieved in that the target component is dosed to a target value which corresponds to the desired nominal value, wherein firstly a further component for after-dosing is dosed to a target value which is lower than a desired nominal value of the component for after-dosing. Then a content of the target component is calculated depending on the actual value of the target component and/or the actual value of the component for after-dosing. The content is compared to the limit value or a tolerance band, wherein if the limit value or tolerance band is exceeded, at least the component for after-dosing is dosed again. Particularly preferably, the content is an absolute value, in particular the determined actual value of the target component, or a relative value, in particular the determined actual value in relation to a sum of the determined actual value of the target component and the determined actual value of the component for after-dosing.

In a suitable refinement, firstly yet a further component for after-dosing is dosed to a target value of the further component for after-dosing, wherein the target value of the further component for after-dosing is lower than a desired nominal value of the further component for after-dosing. Thus the flexibility is increased by dosing a plurality of components accordingly. Particularly preferably, if the content deviates from the limit value or tolerance band, the further component for after-dosing is also after-dosed again.

In a suitable refinement, if the content deviates from the limit value or tolerance band, the target component is also dosed again. This increases the flexibility of being able to intervene in the necessary fashion if the dosing is not yet satisfactory, without having to reject the dosing performed.

In a suitable refinement, if the content deviates from the limit value or tolerance band, the target value of the component for after-dosing is determined again. Preferably, the target value is determined again depending on the nominal value and/or actual value of the target component, particularly preferably depending on a factor of the quotient of the nominal value and actual value of the target component, and in particular multiplied by an actual value of the component for after-dosing. Thus the after-dosing can also be carried out if the target component is under-dosed. In this way, particularly easily, the correction can be made in favor of a precise ratio.

Further suitable refinements arise from the further dependent claims and the description.

BRIEF DESCRIPTION OF THE DRAWINGS

With reference to the appended figures, embodiments of the invention are now described in detail. The drawings show.

DETAILED DESCRIPTION

With reference to the figures, the exemplary embodiments of the invention are described in detail below.

Figure 1:
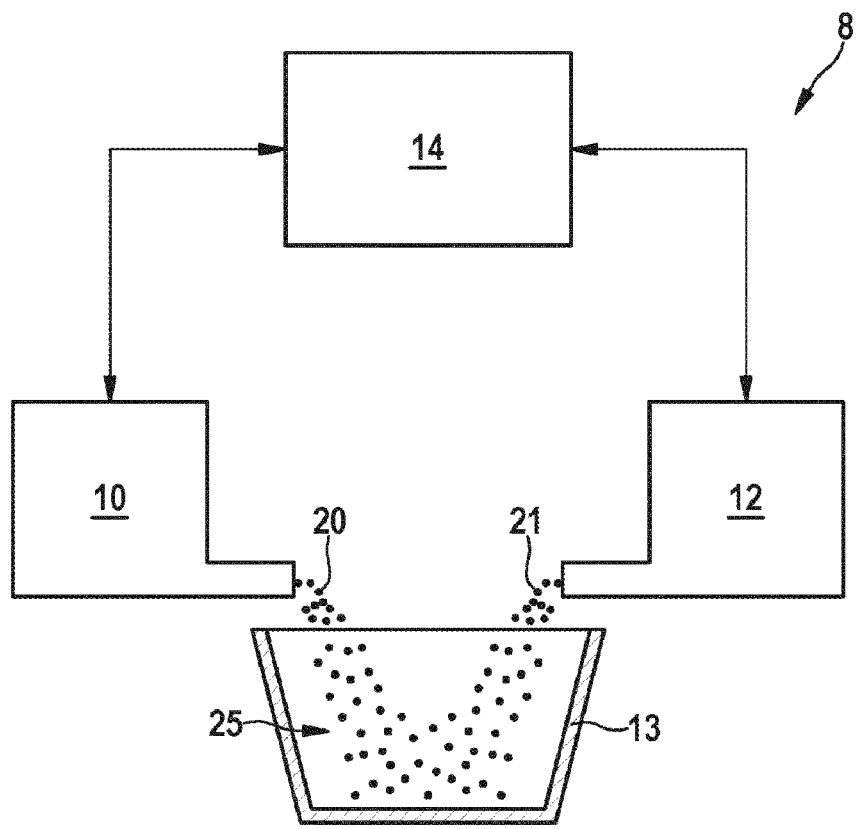
FIG. 1 a schematic overview of a possible apparatus for performing the method for dosing a target component, and FIG. 2 a flow diagram of the method according to the invention for dosing a target component.

FIG. 1 shows an apparatus 8 for dosing a target component 20. The apparatus 8 comprises at least one dosing system 10 and a further dosing system 12 which dose different components, in particular a target component 20 and at least one further component 21, 22, 23 for after-dosing, into a mixture 25 in a recipient container 13 or mixer. The dosing systems 10, 12 are for example screw dosers, preferably gravimetric twin-screw dosers. Other dosing systems 10, 12 may also be provided, depending on application. The recipient container 13 may also comprise a mixing function so that the dosed components 20, 21 can also be mixed at the same time.

A controller 14 actuates the dosing system 10. A controller 14 loads target values Z20, Z21, Z22, Z23 into the respective dosing systems 10, 12. The target values Z20, Z21, Z22, Z23 serve as nominal values for the next dosing process in the respective dosing systems 10, 12. The target value Z20 of the target component 20 corresponds to the desired nominal value S20*soll* of the target component 20. The target values Z21, Z22, Z23 of the component 21 for after-dosing or components 21, 22, 23 for after-dosing however are selected lower than the desired nominal values S21*soll*, S22*soll*, S23*soll* of the respective component 21, 22, 23 for after-dosing.

After the dosing process, the controller 14 receives the true value or actual value G20*ist* of the target component 20, and the actual value(s) G21*ist*, G22*ist*, G23*ist* of the component 21 for after-dosing or components 21, 22, 23 for after-dosing. The actual value G20*ist*, G21*ist*, G23*ist* is in particular the actual weight or a corresponding measure of the weight and volume or similar. The actual value G20*ist*, G21*ist*, G22*ist*, G23*ist* may for example be provided by the respective dosing system 10, 12. Alternatively, corresponding detection means such as scales or similar may also be provided. The controller 14 receives the actual values G20*ist*, G21*ist*, G22*ist*, G23*ist* from the dosing systems 10, 12. The controller 14 determines a content A of the target component 20. The content A may be an absolute value or a relative value in relation for example to a total value, such as the total weight of the target component 20 and the further component 21 for after-dosing or further components 21, 22, 23 for after-dosing. The content A is thus determined depending on the actual value G20*ist* of the target component 20 and/or the actual value G21*ist* of the component 21 for after-dosing or further components 22, 23 for after-dosing. The content A is compared with a limit value T or a tolerance band T. If the content A lies within the permitted tolerance or permitted limit value T, no further after-dosing takes place. Otherwise, at least one of the components 21, 22, 23 for after-dosing is after-dosed. For this, new target values Z21, Z22, Z23 are then determined, with which the components 21, 22, 23 for after-dosing are after-dosed. These new target values Z21, Z22, Z23 then serve as nominal values for the dosing system 12, which then after-doses the components 21, 22, 23 for after-dosing accordingly. Alternatively, as well as the components 21, 22, 23 for after-dosing, the target component 20 may also be dosed again.

The controller 14 in conjunction with an automated dosing system 10, 12, is able to receive values from one or more external sources, process these and issue actuation commands (for example, in the form of corresponding nominal values). These values to be received may come from another software program (for example HMI/recipe management), a controller (for example a programmable controller for dosing), or from the programmable controller of the overall system. Alternatively, the values to be received may be entered in a module manually by a user. Examples of values to be received are for example nominal/actual values, in particular nominal/actual weights, permitted tolerances T, or the maximum total weight. Actuation commands may comprise the transmission of new nominal values Z20, Z21, Z22, Z23 to the dosing systems 10, 12.

The received values or actual values G20*ist*, G21*ist*, G22*ist*, G23*ist* may be processed by the controller 14. Here, the controller 14 determines for example a deviation of the actual value from the nominal value, for example the deviation of the actual weight from the nominal weight. Also, the controller 14 could check individual values against predefined tolerances. Also, the controller 14 could determine the total weight.

The method replaces a conventional dosing process in which usually all components are dosed simultaneously to 100%. With the present method, only the target component 20 is dosed to the desired target value Z20 (100%), and the other components 21, 22, 23 for after-dosing are however dosed to a lower percentage rate relative to the target value Z21, Z22, Z23, such as for example the nominal weight S21*soll*, S22*soll*, S23*soll*. This procedure ensures that the after-dosing can be carried out even if the target component 20 is under-dosed. Optionally however, a minimum of 100% for the target component Z20 may be established, so that the target component Z20 is dosed until 100% of the nominal weight is at least reached, and hence the after-dosing does not lead to failure to reach a specific nominal weight S20*soll*, S21*soll*, S22*soll*, S23*soll* of one or all components. The method proceeds for example as described in connection with FIG. 2.

Figure 2:
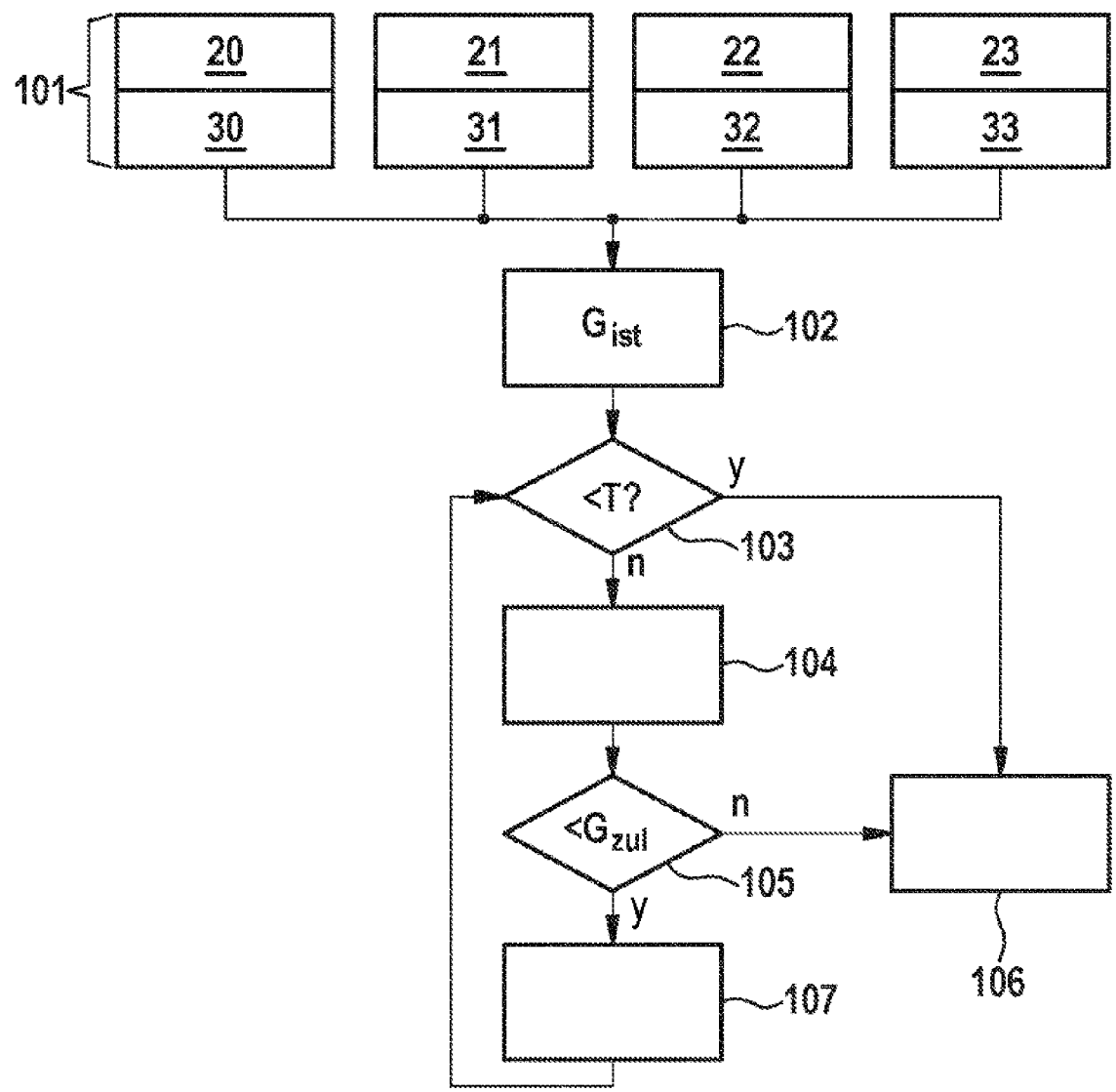

In the flow diagram according to FIG. 2, in a first step 101 the target component 20 is dosed, as part of a dosing 30, to a desired target value Z20, for example 100% in relation to desired nominal value S20*soll*(for example, target weight). As well as the target component 20, at least one further component 21 is dosed. This component 21 for after-dosing is firstly dosed to a target value Z21 with a lower value, for example 90% in relation to the desired nominal value S21*soll*. This takes place by dosing 31 of the component 21 for after-dosing.

In the exemplary embodiment, further components 22, 23 for after-dosing are dosed. Thus a further component 22 for after-dosing is firstly dosed to a lower target value Z22, for example 90% in relation to the desired nominal value S22*soll*, by dosing 32 of the component 22 for after-dosing.

Also a further component 23 for after-dosing is firstly dosed to a lower target value Z23, for example 90% in relation to the desired nominal value S23*soll*, by dosing 33 of the component 23 for after-dosing.

It is essential that only the target component 20 is dosed to the target value Z20 of 100% in relation to the nominal value S20*soll*, while the other components 21, 22, 23 for after-dosing are dosed to a lower target value Z21, Z22, Z23 (for example 90%, as in the exemplary embodiment) in relation to the nominal value S21*soll*, S22*soll*, S23*soll*, in particular the nominal weight. This procedure ensures that the after-dosing can also be carried out if the target component 20 is under-dosed. Optionally however, a minimum of 100% for the target component 20 may be established, so that the target component 20 is dosed until 100% of the nominal weight is at least achieved, and hence the after-dosing does not lead to failure to reach a specific nominal weight of one or all components.

When the dosing step 101 is complete, in a step 102 the true values or actual values are recorded, in the exemplary embodiment the actually dosed weight G20*ist* of the target component 20, or G21*ist*, G22*ist*, G23*ist* of the components 21, 22, 23 for after-dosing. On the basis of the determined actual values G20*ist*, G21*ist*, G22*ist*, G23*ist*, the content A of the target component 20 is calculated (as an absolute value or as a percentage).

In a step 103, the content A of the target component 20 is compared with a limit value T or range (minimum value/maximum value). If the content A lies within the predefined tolerance T or below the limit value T, the dosing process is ended in step 106. Therefore no after-dosing takes place.

If the content of the target component 20 lies outside the tolerance T, new target values Z21, Z22, Z23 are calculated for the components 21, 22, 23 for after-dosing in step 104, and transmitted to the corresponding dosing system 12 as a new actuation command.

The new target values are determined according to step 104 as follows:

Factor f for after-dosing:

$$f = G20ist/S20soll$$

New permitted total value Gzul or Gges (for sampling 105):

$$Gges = f*E(S20soll + S21soll + S22soll + S23soll)$$

The new target values Z21, Z2, Z23 (for step 104) of the component(s) 21, 22, 23 for after-dosing:

$$Zn = f*Gnist (\text{i.e.: } Z21 = f*G21ist, Z22 = f*G22ist, Z23 = f*G23ist)$$

If the total weight Gzul (or the new total weight Gges as described above) is still not reached (sampling 105), the after-dosing process is started according to step 107. Again, the actual values G21*ist*, G22*ist*, G23*ist* of the components 21, 22, 23 for after-dosing, or in some cases the actual value G20*ist* of the target component 20, are sampled (step 102). Again, in step 103 it is checked whether the content A of the target component 20 lies within a range T. The already described steps 106 (if within the permitted tolerance band T) or 104 (outside the permitted tolerance band T with subsequent after-dosing) may follow. Alternatively, as well as the components 21, 22, 23 for after-dosing, the target component 20 could also be dosed again.

The described method is preferably used in dosing of active substances as possible target components 20 for pharmaceutical products. However, other possible applications are conceivable in which a plurality of components are dosed.

What is claimed is:

1. A method for dosing a target component (20), the method comprising:
    dosing the target component (20), using a dosing system (10), to a target value (Z20) that corresponds to a desired nominal value (S20*soll*),
    thereafter, calculating a target value (Z21) of at least one further component (21, 22, 23) for after-dosing that is lower than a desired nominal value (S21*soll*) of the at least one further component (21, 22, 23) for after-dosing,
    thereafter, dosing the at least one further component (21, 22, 23) for after-dosing to the target value (Z21) of the at least one further component (21, 22, 23) for after-dosing,
    thereafter, determining an actual value (G20*ist*) of the target component (20) and at least one actual value (G21*ist*) of the at least one further component (21, 22, 23) for after-dosing,
    thereafter, calculating a content (A) of the target component (20) based on the actual value (G20*ist*) of the target component (20) and/or the actual value (G21*ist*) of the at least one further component (21, 22, 23) for after-dosing,
    thereafter, comparing the content (A) to a limit value (T) or to a tolerance band (T),
    thereafter, determining that the limit value (T) or the tolerance band (T) is exceeded, and
    thereafter, again dosing the at least one further component (21, 22, 23) for after-dosing.

2. The method as claimed in claim 1, characterized in that the content (A) is an absolute value (G20*ist*), or a relative value.

3. The method as claimed in claim 2, characterized in that the absolute value (G20*ist*) is a determined actual value (G20*ist*) of the target component (20), and that the relative value is a determined actual value (G20*ist*) in relation to a sum of the actual determined value (G20*ist*) of the target component (20) and the determined actual value (G20*ist*) of the component (21, 22, 23) for after-dosing.

4. The method as claimed in claim 1, characterized in that firstly another further component (22, 23) for after-dosing is dosed to a target value (Z22, Z23) of the further component (22, 23) for after-dosing, wherein the target value (Z22, Z23) of the further component (22, 23) for after-dosing is lower than a desired nominal value (S22*soll*, S23*soll*) of the further component (22, 23) for after-dosing.

5. The method as claimed in claim 4, characterized in that at least one of (a) the component (21) for after-dosing and (b) the further component (22, 23) for after-dosing is after-dosed until the content (A) does not exceed the limit value (T) or tolerance band (T).

6. The method as claimed in claim 1, characterized in that if the content (A) deviates from the limit value (T) or tolerance band (T), the further component (22, 23) for after-dosing is dosed again.

7. The method as claimed in claim 1, characterized in that if the content (A) deviates from the limit value (T) or tolerance band (T), the target component (20) is also dosed again.

8. The method as claimed in claim 1, characterized in that if the content (A) deviates from the limit value (T) or tolerance band (T), the target value (Z21, Z22, Z23) of the component (21, 22, 23) for after-dosing is determined again.

9. The method as claimed in claim 1, characterized in that the target value (Z21, Z22, Z23) of the component (21, 22, 23) for after-dosing is determined again depending on the nominal value (S20*soll*) and/or the actual value (G20*ist*) of the target component (20).

10. The method as claimed in claim 1, characterized in that the target value (Z21, Z22, Z23) of the component (21, 22, 23) for after-dosing is determined again depending on a factor (f) of a quotient of the actual value (G20*ist*) and the nominal value (S20*soll*) of the target component (20).

11. The method as claimed in claim 10, characterized in that the target value (Z21, Z22, Z23) of the component (21, 22, 23) for after-dosing is determined again depending on the factor (f) multiplied by an actual value (G21*ist*, G22*ist*, G23*ist*) of the component (21, 22, 23) for after-dosing.

12. The method as claimed in claim 1, characterized in that a new limit value (Gges, Gzul) is determined depending on the nominal value (S20*soll*) and/or the actual value (G20*ist*) of the target component (20).

13. The method as claimed in claim 1, characterized in that after a further after-dosing of the component (21, 22, 23) for after-dosing, the actual value (G21*ist*, G22*ist*, G23*ist*) of the component (21, 22, 23) for after-dosing is determined again and the content (A) is determined depending on the newly determined actual value (G21*ist*, G22*ist*, G23*ist*).

14. The method as claimed in claim 1, characterized in that weight or volume is used as the nominal value and/or actual value.

15. The method as claimed in claim 1, characterized in that an active substance of a pharmaceutical product is used as a target component (20).

* * * * *